United States Patent Office 3,149,369
Patented Sept. 22, 1964

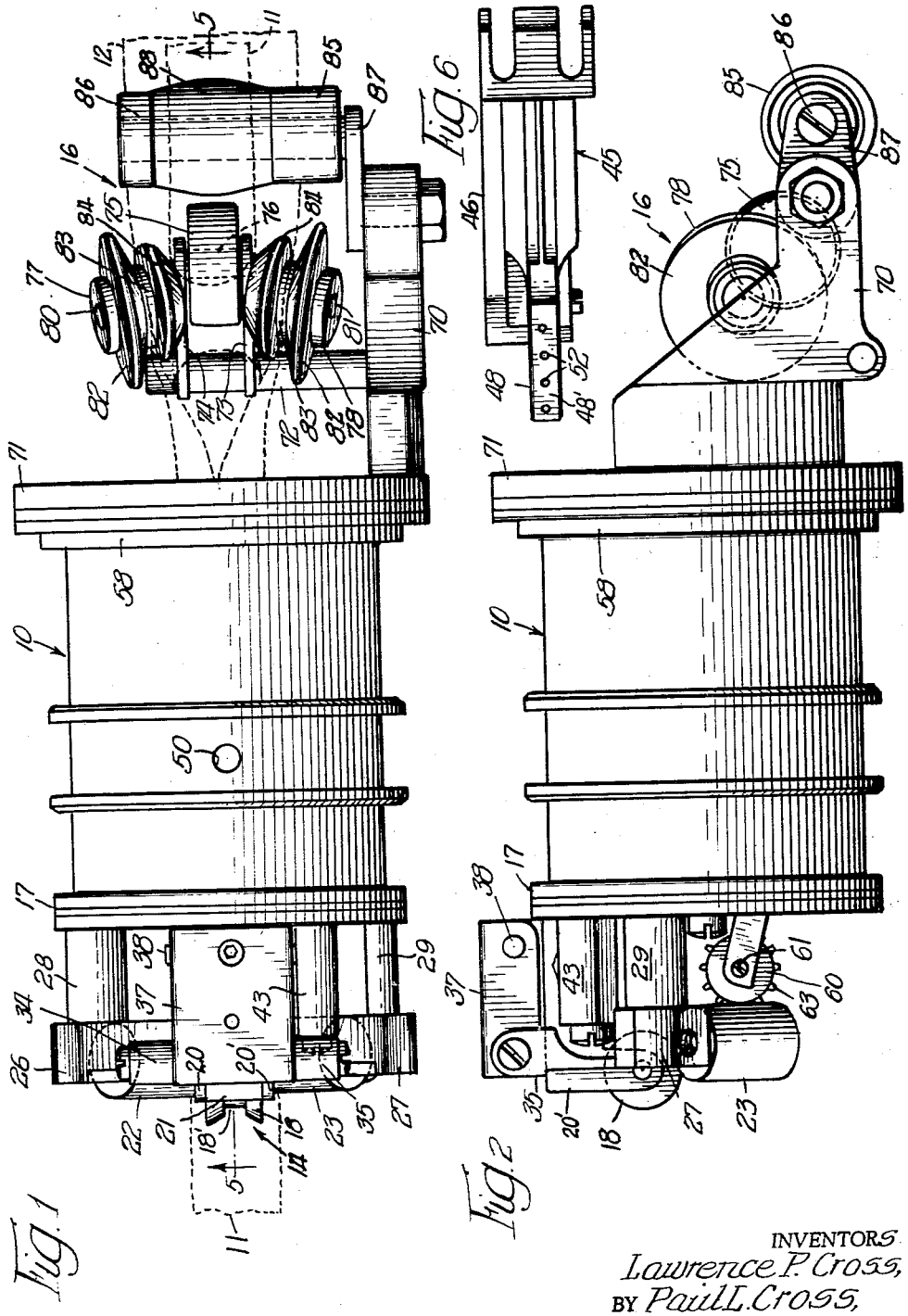

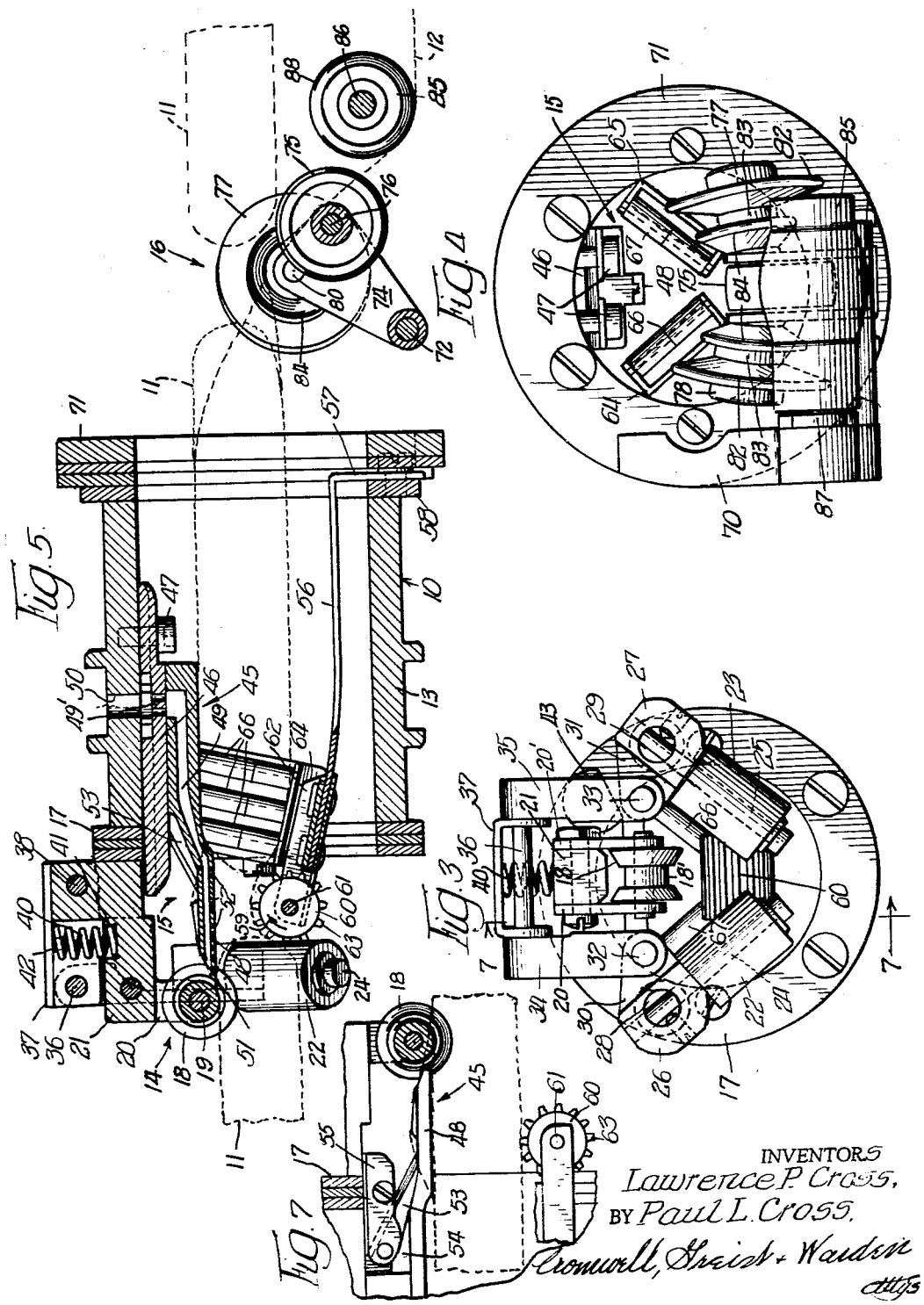

3,149,369
SAUSAGE SKINNING MACHINE
Lawrence P. Cross, R.R. 4, Valparaiso, Ind., and Paul L. Cross, Valparaiso, Ind.; said Paul L. Cross assignor to said Lawrence P. Cross
Filed May 23, 1962, Ser. No. 197,030
11 Claims. (Cl. 17—1)

This invention relates to the manufacture of skinless frankfurters or sausages and is more particularly concerned with improvements in apparatus for removing in a rapid and efficient manner the casing or skin in which the sausages are initially formed and processed.

It is the general object of the present invention to provide improved apparatus for removing the casing from a string of connected sausage lengths which, upon the leading sausages in the string being properly started into the apparatus, will operate automatically upon successive sausages to efficiently and rapidly separate the sausages from the casing.

It is a more specific object of the invention to provide improvements in a machine for operating on successive sausages in a connected string thereof to straighten the casing between each sausage and the next succeeding sausage, to loosen the casing around the successive sausages, to slit the casing lengthwise of the sausages and to completely separate the casing from the sausages.

It is a still more specific object of the invention to provide improvements in the type of machine which has been heretofore provided for removing the casing from a plurality of connected sausage links which is characterized by a skinning head having a hollow, rotatably mounted member with means thereon for guiding the sausages past a plow-like nozzle device which is supplied with air for inflating the casing to loosen the same, a casing slitting means associated with the air plow or nozzle, and mechanism for gripping the slit casing and exerting a pull thereon to move the successive sausages through the head. Such a machine as heretofore provided is disclosed in Gray Patents No. 2,630,598, dated March 10, 1953, and No. 2,689,961, dated September 28, 1954.

It is a further object of the invention to provide in a sausage skinning apparatus of the type described improved mechanism for guiding the sausages past an air plow and casing slitting knife in such a manner as to improve the casing loosening operation of the air plow and insure clean cutting by the slitting knife.

Another object of the invention is to provide in a sausage skinning apparatus of the type described an improved air plow or air nozzle arrangement and associated guide rollers whereby the air plow engages the sausage with a minimum pressure at the end of the plow so that it does not bite into the sausage and an air cushion is maintained between the bottom surface of the plow and the sausage so as to prevent drag of the sausage on the plow surface.

A still further object of the invention is to provide in a sausage stripping apparatus of the type described an improved arrangement for removing the casing from the sausage by a peeling action with the pulling force on the casing being exerted along a center line section of the casing where tearing of the casing is less likely to occur.

These and other objects and advantages of the invention will be apparent from a consideration of the sausage skinning apparatus which is shown by way of illustration in the accompanying drawings, wherein:

FIGURE 1 is a plan view of a rotary type sausage skinning apparatus with the support or mounting structure for the rotating portion of the head being omitted;

FIGURE 2 is a side elevation of the apparatus shown in FIGURE 1;

FIGURE 3 is an end elevation at the entrance or sausage receiving end of the apparatus;

FIGURE 4 is an elevation at the discharge end of the apparatus;

FIGURE 5 is a longitudinal cross section taken on the line 5—5 of FIGURE 1;

FIGURE 6 is a detailed view of the air plow or nozzle and slitting knife holder as removed from the head; and FIGURE 7 is a fragmentary view taken on the line 7—7 of FIGURE 3.

Referring to the drawings, there is illustrated an apparatus which embodies the principal features of the invention and which is adapted to be employed to remove the casing from a length or string of connected sausages of the type which are initially formed and linked by dividing a predetermined length of filled sausage casing into links of uniform length and rotating each successive link to impart a twist in the casing between it and the next succeeding link. When processed sausages of this type may be readily untwisted by rotating each successive sausage in the opposite direction while the remainder of the string is held in non-rotating relation thereto. The casing is of cellulose which does not adhere to itself in the twisted areas during the processing and which will not rupture under tension resulting from the twisting operation.

The illustrated mechanism comprises a skinning head 10 which is adapted to be mounted in a suitable support, such as shown in Patents Nos. 2,630,498 and 2,689,971, in proper alignment to receive the connected sausages 11 as they are advanced longitudinally over a support structure (not shown) at the entrance end of the head. A casing feeding or pulling device (not shown) is employed as in Patents Nos. 2,630,598 and 2,689,971 which is arranged in spaced relation and in proper alignment with the discharge or delivery end of the head 10 for feeding the sausages through the head 10 and disposing of the casing 12.

The skinning head 10 comprises a rotatably mounted open ended cylinder or tubular body member 13 having a sausage guiding mechanism 14 at the entrance end thereof, a casing separating and slitting device 15 extending from within the cylinder 13 and a casing peeling device 16 at the discharge end of the cylinder member 13.

The sausage guiding device 14 is mounted on a ring support 17 which is bolted or otherwise secured to the receiving end of the cylinder member 13. It comprises a center guide roll 18 which is mounted for free rotation on a cross pin 19 extending between a pair of support forming arms 20 and 20' which depend from a forwardly extending bracket member 21 on the mounting ring 17. The center guide roller 18 has a peripheral groove 18' at its center and is provided with marginal surfaces which taper inwardly from the ends of the roller and which are adapted to bear on the curved surface of the sausages as the latter are advanced into the cylinder member 13. Two guide rollers 22 and 23 are disposed in inclined relation to form a V-shaped support for the sausages which is opposite the center guide roller 18 which guide rollers 22 and 23 are resiliently urged toward the roller 18 so as to hold the sausages against the surface of the roller 18 and center the sausages relative to the center of the head. The rollers 22 and 23 are mounted for free rotation on short shaft forming pins 24 and 25 which have their ends mounted in pivot forming brackets 26 and 27. The pivot brackets are supported in pivotal relation on the ends of posts 28 and 29 (FIGURES 1 and 3) extending from the mounting ring 17. The pivot brackets 26 and 27 have arm forming side extensions 30 and 31 which extend laterally of the ends of support posts 28 and 29 and which are pivotally connected at 32 and 33 to the inner ends of a pair of link members 34 and 35. The link members 34 and 35 have their outer ends pivoted on the ends of a cross pin 36 which is supported in the side flanges of an inwardly facing, channel-shaped arm forming member 37 which straddles the end of the bracket member 21 and is pivotally secured thereto by means of the cross pin 38. A compression spring 40 has its one end seated in a recess 41 in the outside face of the bracket arm 21 and its other end retained on a pin 42 extending inwardly from the inside surface of the web portion of the arm member 37 so as to urge the arm member 37 in an outward direction away from the bracket 21, thereby pulling the rollers 22 and 23 in the direction of the center roller 18 so that a sausage fed to the roller 18 is urged against the same with resilient pressure by the spring urged rollers 22 and 23. A post 43 extends from the mounting ring 17 adjacent the extension arm 31 on the pivot bracket 27 and forms a stop for limiting the movement of the guide rollers 22 and 23 toward the longitudinal axis of the cylinder member 13.

The casing loosening and slitting mechanism 15 comprises an air nozzle or plow assembly 45 (FIGURES 5, 6 and 7) which is mounted partially within the cylinder member 13 with the free end portion 48 thereof forming a plow member which is disposed closely adjacent to the center guide roller 18 and positioned so as to enter between the sausage casing 12 and the body of each sausage 11. The air plow or air nozzle assembly 45 includes a base forming plate section 46 which is secured to the inner wall of the cylinder member 13 by a pair of screws or bolts 47. The nozzle free end portion or plow member 48 extends in integral relation from the base plate 46 and is provided with an air passageway 49 having a connection at 49′ with an air supply passage 50 in the wall of the cylinder member 13. The passageway 49 terminates at a slit-like opening 51 extending transversely in the end of the plow member 48 and a plurality of openings 52 are provided on the inside surface which engages with the sausage. The openings 52 are spaced apart a distance corresponding to the transverse dimension of the plow member 48 which engages the sausages as shown in FIGURE 6. On the outer surface which engages with the casing, the plow member 48 is provided with a knife blade 53 (FIGURES 5 and 7) seated in a slot 54 and clamped therein by a small clamp plate 55 which is bolted to the base plate 46.

An elongate plate 56 of spring material is secured in the cylinder member 13 by bolting a flange 57 on the leading end thereof to the end flange 58 at the discharge end of the cylinder 13. The spring plate 56 carries a roller 60 at its free end which is positioned opposite the plow member 48. The roller 60 is carried on a cross pin 61 which is mounted between upturned flanges on a mounting or supporting plate 62 secured on the end of the spring plate 56. The roller 60 is provided with a plurality of peripherally spaced, axially extending ribs 63 and it is mounted on the pin 61 with a one way ball clutch of conventional construction (not shown) so that it can travel only in one direction, that is, clockwise, as shown in FIGURE 5 and as indicated by the arrow 59 thereon which is the direction of advance of the sausages into the cylinder member 13. The roller 60 holds the sausages against the bottom face of the air plow 48 as they advance over the same and prevents back up of the sausage when the line is stopped which would otherwise cause the casing to bunch up in front of the slitting knife 53 with the casing most likely to tear when forward advance thereof is resumed. In addition to the roller 60, the spring plate 56 carries two oppositely inclined U-shaped brackets 64 and 65 which face each other and on which a plurality of small rollers 66 and 67 are mounted. The rollers 66 and 67 are each in two sections and mounted for free rotation on supporting shafts or pins which extend between flange forming leg portions of the U-shaped brackets 64 and 65 as shown in FIGURE 4. The rollers 66 and 67 also support the sausage beneath the plow 48 and help to keep it centered while the casing is being slit by the knife 53.

At the discharge end of the cylinder member 13 a casing peeling mechanism 16 is provided which is supported on a bracket 70 extending from a mounting ring 71, the latter being bolted to the end of the cylinder member 13. The bracket 70 carries a laterally extending post 72 on which a pair of spaced triangular shaped plates 73 and 74 are mounted. A relatively narrow roller 75 is carried on a pin 76 mounted between the ends of the plates 73 and 74. The plates 73 and 74 carry also a pair of spaced roller members 77 and 78 which are mounted on supporting pins 80 and 81. The rollers 77 and 78 are of identical construction but are mounted on shafts or pins 80 and 81 which are inclined relative to the axis of the roller 75 as shown in FIGURES 1 and 4. Each of the rollers 77 and 78 has a plate-like outer portion 82 with an inner face tapering toward and terminating at a center groove 83 and an inner portion 84 which is also plate-like and of smaller diameter than the outer portion 82 and with its inside surface tapering in the same manner as the inner face of portion 82. The marginal edges of the slit casing are guided into the grooves 83 of the rollers 77 and 78 as the sausages advance from the cylinder 13 and the casing is pulled downwardly beneath an end roller 85 which is supported on a cross shaft 86 extending from the end of a bracket 87 which is bolted onto the end of the main supporting bracket 70. The roller 85 has an outwardly bowed center section 88 and the casing is adapted to pass beneath the same to a pair of pull rollers (not shown) which are spaced beyond the end roller 85 so as to advance the casing as indicated in FIGURE 5.

The cylinder member 13 is provided with a sprocket and chain drive means (not shown) for rotating the same about its longitudinal axis in the fixed support in which it is mounted. The drive mechanism is preferably controlled by a sensing apparatus such as shown in Patent No. 2,689,971 so that the cylinder member 13 is rotated to remove the twist in the casing between each sausage and the next succeeding sausage in the connected string in order to straighten out the casing as it advances to the plow forming end 48 of the casing loosening and slitting mechanism. Reference may be had to Patent No. 2,689,971 for details of the drive mechanism and the control therefor since this apparatus does not constitute a part of the present invention.

In operating a skinning machine incorporating the present apparatus wherein the cylinder member 13 is mounted as described for rotation about its longitudinal axis in a fixed support and provided with suitable drive and control mechanism for rotating the same to straighten the casing between successive sausages as they enter the receiving end of the cylinder 13, the end of the casing of a string of sausages which are to be fed to the skinning head is initially opened up so that the first sausage may be inserted between the groove guide roller 18 and the two resiliently mounted inclined rollers 22 and 23 and the plow member 48 inserted between the casing and the body of the sausage. The air coming through the nozzle apertures 51 and 52 inflates the casing ahead of the nozzle and loosens the same from the body of the sausage as the sausage advances over the roller 60 which holds the sausage against the bottom surface of the plow 48. The string is threaded through the cylinder 13 and the end of the casing 12 is draped over the roller 75 with the side margins of the slit casing positioned in the grooves 83 of the peeling rollers 77 and 78. The leading end of the casing 12 is guided beneath the end roller 85 and advanced to the drive rollers (not shown) which are operated to exert a pull on the casing 12 so as to draw the string through the head 10, with each sausage moving through the head due to the pull on the casing 12 and the casing being loosened and slit and then peeled from the successive sausages and freeing the sausages for discharge over the top of the end roller 25.

While particular materials and specific details of construction are referred to in describing the illustrated form of the apparatus, it will be understood that other materials and different details of construction may be resorted to within the spirit of the invention.

We claim:

1. In a machine for removing the casing from a string of connected sausages which are characterized by a twist in the casing between the individual sausages, casing straightening and removing mechanism comprising a cylinder mounted for rotation about its longitudinal axis, a casing loosening and slitting device supported in the one end of said cylinder, and guide means mounted on said cylinder for engaging successive sausages and guiding the same in an axial direction through said cylinder which guide means includes a grooved center roller positioned for engaging the sausages adjacent the casing loosening and slitting device and a pair of cooperating guide rollers disposed in V-shaped arrangement opposite the grooved center roller for engaging the sausages, said cooperating guide rollers being mounted on supporting shafts which supporting shafts are pivotally connected to said cylinder and means resiliently urging said cooperating guide rollers in the direction of the grooved roller.

2. In a machine for removing the casing from a string of connected sausages which are characterized by a twist in the casing between the individual sausages, casing straightening and removing mechanism comprising a rotatably mounted hollow ring member, a casing loosening and slitting device supported in the end of said ring member, and guide means mounted on said ring member for engaging successive sausages and guiding the same in an axial direction through said ring member which guide means includes a grooved center guide roller positioned for engaging the sausages adjacent the end of the casing loosening and slitting device and a pair of side guide rollers disposed in diverging relation so as to form a V-shaped arrangement opposite the grooved center guide roller for engaging the sausages and holding the same against the center guide roller, said side guide rollers being mounted on supporting shafts which supporting shafts are hingedly mounted on posts fixed to said ring member adjacent opposite ends of the center guide roller and means for resiliently urging said side guide rollers in the direction of the grooved roller.

3. In a machine for removing the casing from a string of connected sausages which are characterized by a twist in the casing between the individual sausages, casing straightening and removing mechanism comprising a hollow cylinder mounted for rotation about its longitudinal axis, a casing loosening and slitting device supported in the sausage receiving end of said cylinder, and guide means mounted on said cylinder for engaging successive sausages and guiding the same in an axial direction through said cylinder which guide means comprises a grooved guide roller positioned for engaging the sausages adjacent the casing loosening and slitting device and a pair of cooperating guide rollers mounted on supporting shafts which are disposed in V-shaped arrangement opposite the grooved guide roller for engaging the sausages, said guide roller shafts being pivotally supported on posts extending from the end of the cylinder adjacent the ends of the grooved guide roller, a pair of link members pivotally connected to the end portions of said shafts and spring means operative on said pair of link members to resiliently urge said cooperating guide rollers in the direction of the grooved guide roller.

4. In a mechanism for stripping casings from a string of connected link sausages which sausages are characterized by a plurality of twists in the casing between the respective sausages, said mechanism comprising a rotatably mounted head having an axial passageway therein for receiving successive sausages, a nozzle supported in said head in spaced relation to a portion of the wall defining said passageway and a slitting knife supported between the nozzle and adjacent wall portions of said passageway, said nozzle and said slitting knife being supported in the receiving end of said head and being rotatable with said head, means on said head for guiding successive sausages axially through said passageway with said nozzle engaging between the casing and the sausages, which guiding means comprises a grooved roller for engaging the side of the sausage adjacent the nozzle and a pair of hingedly mounted rollers disposed in V-shaped arrangement opposite the grooved roller for engaging the sausages at points spaced opposite the grooved roller, and supplemental means for urging the sausages in the direction of the nozzle with resilient pressure, said auxiliary means comprising a spring plate mounted at one end in the discharge end of the head and carrying on its other end a sausage engaging roller which is disposed in spaced relation to the nozzle and inwardly of the V-shaped roller arrangement in the direction of the head.

5. In a mechanism for stripping casings from a string of connected link sausages which sausages are characterized by a plurality of twists in the casing between the respective sausages, said mechanism comprising a rotatable head having an axial passageway therein for receiving successive sausages, a nozzle supported in said head in spaced relation to a portion of the wall defining said passageway, said nozzle having a plow forming end and a slitting knife supported between the nozzle and adjacent wall portions of said passageway, said nozzle and said slitting knife being rotatable with said head, means on said head for guiding successive sausages axially through said passageway with said nozzle engaging between the casing and the sausages, said guiding means comprising a grooved roller disposed in fixed relation to the nozzle and aligned therewith for engaging the side of the sausage adjacent the nozzle and a pair of cooperating rollers mounted on shafts which are pivotally supported at one end and form a generally V-shaped arrangement opposite the fixed roller for engaging the sausages at points spaced opposite the grooved roller, spring means for urging the cooperating rollers toward the grooved roller, and supplemental means for urging the sausages in the direction of the nozzle with resilient pressure, said auxiliary means comprising an elongate spring plate mounted at one end in the discharge end of the head and carrying on its other end a roller which is positioned opposite the nozzle and is adapted to resiliently urge the sausages against the nozzle.

6. In a mechanism as recited in claim 5, and the roller which is carried on the spring plate having axially extending rib formations on its surface and being mounted for rotation in the direction of advance of the sausages only.

7. In a machine for removing the casing from a string of connected sausages which are characterized by a twist in the casing between the individual sausages, casing slitting and removing mechanism comprising a rotatably mounted ring member, a casing loosening and slitting device having a portion secured within one end of said ring member, a plow forming end on said loosening and slitting device, guide means associated with said device for engaging successive sausages and guiding the same relative to said device whereby the sausages are advanced with said plow forming end inserted between the casing and the body of the sausages and the casing is continuously loosened and slit, and a casing peeling means at the other end of said ring member which comprises a relatively narrow sausage supporting roller and a pair of grooved casing peeling rollers mounted for free rotation on axes which are inclined relative to the axis of the supporting roller so as to form a V-shaped trough with the grooves in the two inclined rollers adapted to receive the side edges of the slit casing which is guided downwardly therefrom beneath the supporting roller.

8. In a machine for removing the casing from a string of connected sausages which are characterized by a twist in the casing between individual sausages, casing slitting and removing mechanism comprising a rotatably mounted cylindrical member having supported therein a casing loosening and slitting device, guide means for engaging successive sausages and guiding the same relative to said device whereby the casing is continuously loosened and longitudinally slit, a supporting post extending across the delivery end of said cylinder member, a pair of generally triangular support plates mounted in spaced relation on said post, a sausage supporting roller journaled between the plates at the other end thereof, and a pair of inclined shafts extending outwardly of the ends of the plates and carrying a pair of casing peeling rollers having a center groove and plate-like outer sections whereby to form with the supporting roller a generally V-shaped trough for the passage of the sausages with the side margins of the slit casing being pulled down into the grooves in the inclined rollers so as to peel the same from the sides of the sausage and thereafter passing from the grooved rollers beneath the support roller so as to separate the casing from the sausages.

9. In a machine for removing the casing from a string of connected sausages which are characterized by a twist in the casing between individual sausages, casing slitting and removing mechanism comprising a cylindrical member mounted for rotation about its long axis, a casing loosening and slitting device in said cylindrical member, guide means for engaging successive sausages and guiding the same relative to said device whereby the casing is continuously loosened and longitudinally slit, a supporting post extending transversely of the delivery end of said cylindrical member, a pair of support plates mounted in spaced relation on said post, a relatively narrow sausage supporting roller journaled between the plates, and a pair of inclined shafts extending outwardly of the plates at the ends of said supporting roller and carrying a pair of rollers having a center groove and plate-like end sections whereby to form with the supporting roller a generally V-shaped trough for the passage of the sausages with the side margins of the slit casing being received into the grooves in the inclined rollers and passed beneath the support roller so as to peel the casing from the sausages.

10. In a machine for removing the casing from a string of connected sausages which are characterized by a twist in the casing between individual sausages, casing slitting and removing mechanism comprising a hollow cylinder mounted for rotation about its longitudinal axis, a casing loosening and slitting device mounted in said cylinder, guide means at the end of said cylinder for engaging successive sausages and guiding the same relative to said device whereby the casing is continuously loosened and longitudinally slit, a supporting member extending transversely of the delivery end of said cylinder, a sausage supporting roller journaled on said supporting member with its axis extending transversely of said cylinder, and a pair of inclined casing peeling rollers each having a center groove and plate-like end sections journalled in said supporting member whereby to form with the supporting roller a generally V-shaped trough for the passage of the sausages with the casing being guided beneath the supporting roller and the side margins of the slit casing being pulled into the grooves in the inclined rollers so as to peel the same from the sides of the sausage and to separate the same from the sausages.

11. A mechanism for stripping casings from a string of connected link sausages which sausages are characterized by twists in the casing between respective sausages, said mechanism comprising a rotatably mounted tube-like member, a nozzle secured in said rotatable member in spaced relation to an inner wall thereof and having a plow forming end portion, a slitting knife secured between the nozzle and said inner wall, sausage guiding means including a roller having a circumferential guide groove mounted in said tube-like member mounted adjacent the plow forming end portion of said nozzle and a co-operating resiliently mounted roller spaced from said grooved roller so as to define a path for guiding successive sausages in an axial direction through said tube-like member with the plow forming end portion of said nozzle engaging between the casing and the sausages, means connected with said nozzle for supplying air under pressure to said nozzle, said plow forming end portion of said nozzle having a relatively narrow elongate surface which engages with the sausages, said nozzle having an air passageway extending to a slit-like aperture in the plow forming end portion and a plurality of small air holes spaced lengthwise along said narrow elongate surface, said air holes being spaced apart along the length of said narrow elongate surface a distance corresponding to the transverse dimension of said narrow elongate surface whereby to loosen the casing around the sausages and continuously slit the casing as the sausages are moved through the tube-like member.

References Cited in the file of this patent

UNITED STATES PATENTS

| | | |
|---|---|---|
| 2,623,237 | Schaller | Dec. 30, 1952 |
| 2,689,971 | Grey | Sept. 28, 1954 |
| 2,779,968 | Hensgen | Feb. 5, 1957 |